United States Patent [19]

Gladrow

[11] 4,182,693
[45] * Jan. 8, 1980

[54] HYDROCARBON TREATING CATALYST

[75] Inventor: Elroy M. Gladrow, Baton Rouge, La.

[73] Assignee: Exxon Research & Engineering Co., Florham Park, N.J.

[*] Notice: The portion of the term of this patent subsequent to Apr. 24, 1996, has been disclaimed.

[21] Appl. No.: 936,804

[22] Filed: Aug. 25, 1978

Related U.S. Application Data

[63] Continuation-in-part of Ser. No. 746,188, Nov. 30, 1976, abandoned, which is a continuation-in-part of Ser. No. 626,225, Oct. 28, 1975, abandoned.

[51] Int. Cl.² .............................................. B01J 29/06
[52] U.S. Cl. ................................ 252/455 Z; 208/120
[58] Field of Search ..................... 252/455 Z; 208/120

[56] References Cited

U.S. PATENT DOCUMENTS

| | | | |
|---|---|---|---|
| 3,312,615 | 4/1967 | Cramer et al. | 208/120 |
| 3,542,670 | 11/1970 | Erickson et al. | 208/120 |

Primary Examiner—Carl F. Dees
Attorney, Agent, or Firm—Marthe L. Gibbons

[57] ABSTRACT

A catalyst suitable for treating hydrocarbons comprising (1) particles of a crystalline aluminosilicate zeolite, (2) particles of a substantially catalytically inert inorganic oxide having a size of less than 10 microns in diameter, and (3) a catalytic inorganic oxide gel matrix.

16 Claims, No Drawings

HYDROCARBON TREATING CATALYST

CROSS REFERENCE TO RELATED APPLICATIONS

This application is a continuation-in-part of U.S. application Ser. No. 746,188 filed Nov. 30, 1976, now abandoned, which is a continuation-in-part of U.S. application Ser. No. 626,225 filed Oct. 28, 1975, now abandoned, the teachings of both of which are hereby incorporated by specific reference.

BACKGROUND OF THE INVENTION

1. Field of the Invention

The present invention relates to novel hydrocarbon treating catalysts, methods for their preparation and uses thereof in hydrocarbon treating processes. More particularly, the present invention relates to a catalytic cracking catalyst suitable for the conversion of high metals content hydrocarbon feeds.

2. Description of the Prior Art

Conventional hydrocarbon conversion catalysts are known to become rapidly deactivated by contact with hydrocarbon feeds containing large amounts of metallic contaminants. Typical feeds utilized, for example, in catalytic cracking have been gas oils, even though conversion of heavy petroleum crude oils and residual oils would increase the yield of gasoline obtainable from a barrel of oil. The heavy crude oils and residual oils, such as bottoms from atmospheric or vacuum distillation of crude oil contain large amounts of material having atmospheric pressure boiling points above 1050° F.+ and contain relatively large amounts of metallic contaminants generally present as organometallic compounds, large amounts of nondistillable asphaltenes, i.e., pentane or heptane-insoluble material, large amounts of sulfur and nitrogen and a high Conradson carbon residue. The actual amounts of these materials will vary according to the source of the crude and cut point made during the crude distillation. Tar sand oils, shale oils and liquified retorted coal present similar processing difficulties. To facilitate the total refining of these heavy hydrocarbon oils, they may be subjected to a hydrogen refining process. Although the hydrogen refining step facilitates handling and further processing operations since it may remove some of the metals, sulfur, nitrogen and polar compounds, it does not significantly affect the asphaltenes and the Conradson carbon residue contents. Consequently, the hydrogen refined heavy crudes and residua still contain large amounts of materials which are normally deleterious to conventional cracking catalysts. The deposition of metals on the catalyst, principally nickel, vanadium and iron is particularly disadvantageous since these metals adsorb on or near active catalytic sites and act as catalytic agents to produce hydrogen, methane and coke instead of the desired more valuable products such as gasoline and light olefins.

The deleterious effect of feed metal deposition on the hydrocarbon conversion catalyst can be minimized with a catalyst comprising as one component an adsorbent having specified range of surface area and pore volume distribution composited with an inorganic oxide gel as second component and a crystalline aluminosilicate zeolite component. It has now been found that the attrition resistance of a catalyst comprising an adsorbent having specified physical characteristics (i.e., a substantially catalytically inert inorganic oxide) can be improved if the adsorbent is present in the composite catalyst as discrete particles of less than about 10 microns.

Hydrocarbon conversion catalysts comprising a zeolite dispersed in a siliceous matrix are known, see, for example, U.S. Pat. No. 3,140,249 and U.S. Pat. No. 3,352,796. Cracking catalysts containing a zeolite, silica-alumina and clay are also known, see, for example, U.S. Pat. No. 3,449,265. Hydrocarbon conversion catalysts comprising a physical mixture of silica-alumina and a crystalline aluminosilicate zeolite in a siliceous matrix are also known, see, for example, U.S. Pat. No. 3,558,476. Processes for preparing hydrocarbon conversion catalysts containing a zeolite, clay and silica or silica-alumina are disclosed in U.S. Pat. Nos. 3,867,308 and 3,867,310.

U.S. Pat. No. 3,312,615 discloses a catalyst comprising a zeolite, an inorganic oxide matrix and inert fines having a particle size ranging from 0.1 to 10 microns.

U.S. Pat. No. 3,542,670 discloses a hydrocarbon cracking catalyst comprising amorphous silica-alumina, separately added alumina and a zeolite.

SUMMARY OF THE INVENTION

In accordance with the invention there is provided a catalyst comprising: (1) particles of a crystalline aluminosilicate zeolite; (2) particles of a substantially catalytically inert inorganic oxide having a particle size of less than about 10 microns in diameter, and (3) a catalytic inorganic oxide matrix, said catalytically inert inorganic oxide having initially a surface area greater than 100 square meters per gram and having at least 0.2 cubic centimeter per gram of its pore volume in pores having diameters ranging from about 90 to about 200 Angstroms.

In accordance with the invention, there is also provided a hydrocarbon treating process utilizing the above-stated catalyst.

DESCRIPTION OF THE PREFERRED EMBODIMENT

In general, the catalyst composition of the present invention will comprise from about 0.1 to about 40 weight %, preferably from about 5 to about 20 weight % of a crystalline aluminosilicate zeolite, from about 5 to about 40 weight %, preferably from about 10 to about 30 weight % discrete particles of a substantially catalytically inert inorganic oxide, and from about 40 to about 90 weight %, preferably from about 50 to about 80 weight % of a catalytic inorganic oxide matrix, all weight being based on the total catalyst.

Zeolite Component

The crystalline aluminosilicate zeolite component of the catalyst may be chosen from any of the known zeolites. Examples of these zeolites include the zeolites designated by the Linde Division of Union Carbide Corporation by the letters X, Y, A, L (these zeolites are described in U.S. Pat. Nos. 2,882,244; 3,120,007; 2,882,243 and Belgian Pat. No. 575,117, respectively) as well as the naturally occurring crystalline zeolites such as faujasite, chabazite, erionite, mordenite, offretite, gmelinite, analcite, etc.

In general, the chemical formula of anhydrous crystalline aluminosilicate zeolites, expressed in terms of moles, may be generally represented as follows: $0.9 \pm 0.2 \, M_2O:Al_2O_3:ZSiO_2$ wherein M is selected from the group consisting of hydrogen, monovalent, divalent and trivalent metal cations and mixtures thereof, n is the valence of the cation and Z is a number from about 1.5 to about 12, said value being dependent upon the particular type of zeolite. The zeolite, as produced or found in nature normally contains an alkali metal such as sodium and/or potassium and/or an alkaline earth metal such as calcium and magnesium. The zeolites differ from each other in structure, composition and particularly in the ratio of silica to alumina contained in the crystal lattice structure. For use in hydrocarbon conversion processes, the higher silica to alumina ratio among isostructural zeolites are preferred because of their higher stability at elevated temperature, particularly in the presence of steam. Therefore, whereas the zeolite component of the present invention may be any of the above-stated zeolites, the zeolites having silica to alumina ratios above 3 will be preferred. This includes natural and synthetic faujasite and mordenite. Typical among these zeolites is the synthetic faujasite variety wherein Z in the above formula is about 2.3 to 7, preferably 3 to 6, more preferably 4.5 to 5.5. A high silica to alumina ratio zeolite is zeolite Y. Type X zeolite wherein Z in the above formula is less than 3, e.g., 2.5 may also be used to advantage, although the most preferred zeolite components for use in the catalyst of the present invention will be those having a silica to alumina ratio greater than 3. The crystalline zeolites have uniform pore openings ranging in diameter from 3 to 15 Angstroms. The preferred pore size catalyst for use as a zeolite component in the present invention will be zeolites having uniform pore diameters ranging from about 6 to about 15 Angstroms. For use as a hydrocarbon conversion catalyst component, it is usually necessary to reduce the alkali metal content of the crystalline aluminosilicate zeolite to a content of less than 10 weight percent, preferably less than 6 weight percent, and more preferably about 1 to 5 weight percent since the alkali metal components are normally undesirable catalytic components for the desired hydrocarbon conversion reactions. The alkali metal content reduction may be accomplished, as is well known in the art, by exchange with any one or more of the cations selected from Group IB through Group VIII metals of the Periodic Table of Elements (the Periodic Table referred to herein is given in the *Handbook of Chemistry and Physics,* published by the Chemical Rubber Publishing Company, Cleveland, Ohio, 45th Edition, 1964), as well as hydrogen cation or hydrogen precursor (i.e. $NH_4^+$) capable of conversion to hydrogen cation. The preferred cations are those selected from the group consisting of rare earth metals, calcium, magnesium and hydrogen or mixtures thereof.

Suitable amounts of zeolite component in the catalyst of the present invention include from about 0.1 to about 40 weight percent, preferably from about 5 to about 20 weight percent based on the total catalyst. Desirably, the zeolite particles range in size from about 0.1 to 10 microns, preferably at least about 50 percent of the particles having a size below about 5 microns, more preferably at least about 50 percent of the particles having a size below about 2 microns in diameter. If the zeolite particles used as starting material are greater than the desired size, the zeolite particles can be reduced in size by conventional methods such as ballmilling, grinding, deflocculation, high velocity jet impringement, etc.

Inorganic Oxide Matrix Component

The inorganic oxide matrices suitable as component of the catalyst of the present invention are amorphous catalytic inorganic oxides such as silica, silica-alumina, silica-zirconia, silica-magnesia, alumina-boria, alumina-titania, and the like, and mixtures thereof. Preferably, the inorganic oxide matrix is a silica-containing gel, more preferably the inorganic oxide gel is an amorphous silica-alumina component such as a conventional silica-alumina cracking catalyst, several types and compositions of which are commercially available. These materials are generally prepared as a cogel of silica and alumina or as alumina precipitated on a preformed and pre-aged siliceous hydrogel. In general, silica is present as the major component in the catalytic solids present in such gels, being present in amounts ranging between about 55 and 100 weight percent, preferably the silica will be present in amounts ranging from about 70 to about 90 weight percent. Particularly preferred are two cogels, one comprising about 75 weight percent silica and 25 weight percent alumina and the other comprising about 87 weight percent silica and 13 weight percent alumina. The inorganic oxide matrix component will be present in the catalyst of the present invention in an amount ranging from about 40 to about 90 weight percent, preferably from about 50 to about 80 weight percent based on the total catalyst.

Catalytically Inert Inorganic Oxide

The catalytically inert inorganic oxide component may be present in the finished catalyst in an amount ranging from about 5 to about 40 weight percent, preferably from about 10 to about 30 weight percent based on the total catalyst. By the term "catalytically inert" is intended herein that the inorganic oxide has substantially no catalytic activity or has less catalytic activity than the inorganic gel component of the catalyst. Preferably, the inorganic oxide will be an adsorptive porous bulk material. The term "bulk" with reference to the inorganic oxide is intended herein to designate a material which has been preformed and placed in a physical form such that its surface area and pore structure is stabilized so that when it is added to an impure inorganic gel containing considerable amounts of residual soluble salts, the salts will not alter the surface and pore characteristics measurably nor will they promote chemical attack on the preformed adsorbent which could then undergo change. For example, addition of "bulk" alumina will mean a material which has been formed by suitable chemical reaction, the slurry aged, filtered, dried, washed free of residual salts and then heated to reduce its volatile contents to less than about 15 weight percent. The resulting inorganic oxide is suitable for use as the inert inorganic oxide of the present invention. Suitable materials for use as inert inorganic oxide in the catalyst of the present invention include alumina, titania, silica, zirconia, magnesia and mixtures thereof. Preferably, the inorganic oxide is a bulk alumina. Any type of alumina is suitable provided that it has the physical characteristics required by the present invention, for example, a gamma alumina having the required physical characteristics.

The inert inorganic oxide initially used as component in the catalyst of the present invention, after heating at 1000° F. in air for six hours, will have a surface area greater than 100 $m^2/g$, preferably at least 200 $m^2/g$. The inert inorganic oxide must have at least 0.2 cubic centimeter per gram of its pore volume in pores having diameters ranging from about 90 to about 200 Angstroms. It should be noted that the above stated physical characteristics of the inert inorganic oxide are those of the inert inorganic oxide prior to being composited with the other components. The finished total catalyst of the present invention will have a pore size distribution such that when the pore volume is measured after subjecting the finished catalyst to stream treatment at 1400° F., 0 psig, for 16 hours, it will have at least 0.4 cubic centimeter per gram of its pore volume in pores having diameters greater than 90 Angstroms. The pore volume referred to herein is determined by nitrogen adsorption (BET method). The particles of the inert inorganic oxide of the present invention have a size ranging up to about 10 microns. Preferably, at least 50 percent of the particles have a size below about 5 microns, more preferably at least 50 percent of the particles have a size below about 2 microns in diameters. If the particles of the initial inert inorganic oxide are greater than 10 microns, the particles can be subjected to particle size reduction by conventional methods, such as grinding, ballmilling, jet velocity stream impingement, deflocculation, deagglomerating the particles in a slurry by means of a chemical dispersant, etc.

The catalysts of the present invention may be prepared by any one of several methods. A preferred method of preparing one of the catalysts of the present invention, that is, a catalyst comprising silica-alumina and as inert inorganic oxide, alumina, is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. Separately, a bulk alumina is made, for example, by reacting solutions of sodium aluminate and aluminum sulfate, under suitable conditions, aging the slurry to give the desired pore properties of the alumina, filtering, drying, reslurrying in water to remove sodium and sulfate ions and drying to reduce volatile matter content to less than 15 weight percent. The resulting particles are then ground or ballmilled to give discrete particles having a diameter of less than 10 microns. The alumina particles are then slurried in water and blended, in proper amount, with the slurry of impure silica/alumina hydrogel.

The zeolite component is also added to this blend, for example, as discrete particles of zeolite slurried in water. The zeolite particles, if desired, may be added to the alumina-water slurry or the zeolite may be added separately to the slurry of impure silica/alumina hydrogel.

A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is recovered after calcination for 6 hours at 1000° F. in air. When this catalyst is tested, after subjecting it to steam treatment for 16 hours at 0 psig and 1400° F., it will have at least 0.4 cc/g of its pore volume in pores having diameters greater than 90 Angstroms to be suitable as catalyst of the present invention.

The catalyst of the present invention is suitable for hydrocarbon treating processes such as catalytic cracking, hydrocracking, isomerization, alkylation, and other carbonium ion catalyzed reaction types. It is particularly suited for use in catalytic cracking processes and it is especially suited for catalytic cracking of high boiling point hydrocarbonaceous feeds having high metals content, a high Conradson carbon residue, high sulfur content, high nitrogen and other polar molecules.

Catalytic cracking with a catalyst of the present invention can be conducted in any conventional catalytic cracking manner. Suitable catalytic cracking conditions include a temperature from about 700° F. to about 1050° F. and a pressure ranging from about subatmospheric to several hundreds of atmospheres.

The usual conditions which may be employed include a temperature ranging from about 750° to about 1025° F., and a pressure ranging from atmospheric to 100 psig, typically from atmospheric to about 20 psig. The process may be carried out in a fixed bed, moving bed, ebullient bed, slurry, transferline or a fluidized bed operation.

Although the catalysts of the present invention can be used to convert any of the conventional hydrocarbon feeds used in a given process (that is, it can be used to crack heavy naphthas and gas oils), they are especially suitable for feeds containing a high content of metal contaminants. By way of example, the catalyst of the present invention can be used to convert heavy crude oils, and residual oils such as petroleum atmospheric or vacuum distillation tower bottoms. The residual oils may contain 95 to 99 weight percent or more of the nickel and vanadium content of the crude oil feed. For example, the total metals content of such oils may range up to 2,000 weight ppm or more and the sulfur content may range up to 8 weight percent or more. The Conradson carbon residue of the heavy feeds will generally range from about 1 to about 50 weight percent (as to Conradson carbon residue, see ASTM test D-189-65), although the catalyst can be used to convert lower Conradson carbon feeds.

The following example is presented to illustrate the invention.

EXAMPLE

Three catalysts were prepared, which are designated herein catalysts A, B and C. Each catalyst comprised 11 weight percent of a rare earth exchanged Y-type zeolite, hereinafter designated RE-Y, wherein the rare earth metal component, calculated as the oxide, based on the total catalyst was about 2.6 weight percent; 29 weight percent bulk porous alumina having a surface area of 393 m$^2$/g and a pore volume in 90 to 200 Angstrom diameter pore range of 1.21 cc/g. The matrix of each catalyst was 60% of a silica-alumina gel (75% silica and 25% alumina).

The RE-Y was pre-exchanged and calcined, and was mostly in the 1–5 micron size range with some larger agglomerates of smaller crystals. The bulk porous alumina as supplied was as spray dried microspheres, many in the 10+ micron size range and constituted agglomerated crystallites. The silica-alumina gel was from a large batch made by gelling sodium silicate with $CO_2$, ageing, and then adding alumina as aluminum sulfate to give an impure gel comprising about 75% $SiO_2$/25% $Al_2O_3$ as the catalytic solids composition. The catalysts were made by slurrying the bulk porous alumina and the RE-Y separately in $H_2O$ and then admixing with the silica-alumina gel, spray drying, washing, and finally drying and calcining 6 hours at 1000° F. Catalyst A was made using the materials on hand, i.e., the bulk porous alumina and the RE-Y were used without any ballmilling. Catalyst B was made using bulk porous alumina that had been ballmilled for about 16 hours (overnight) before compositing it in the catalyst. Catalyst C was made using both bulk porous alumina and RE-Y that had been ballmilled individually before compositing them with the silica-alumina gel. Catalysts A, B and C, after calcining 6 hours at 1000° F. were tested for attrition properties. The results are tabulated below.

| Catalyst | A | B | C |
| --- | --- | --- | --- |
| Attrition Rate, %/Hr. | 17.1 | 7.7 | 5.7 |

Catalysts B and C are catalysts in accordance with the present invention. As can be seen from the above-stated attrition tests, catalysts B and C were more attrition resistant than catalyst A, which does not have the alumina particle size required by the present invention.

What is claimed is:

1. A catalyst comprising:
    (a) particles of a crystalline aluminosilicate zeolite;
    (b) particles of a substantially catalytically inert inorganic oxide having a size of less than about 10 microns in diameter, and
    (c) a catalytic inorganic oxide matrix, said inert inorganic oxide having initially a surface area greater than 200 square meters per gram and having at least 0.2 cubic centimeter of its pore volume in pores having diameters ranging from about 90 to about 200 Angstroms.

2. The catalyst of claim 1 wherein at least about 50 percent of said particles of a substantially inert inorganic oxide have a size of less than about 5 microns in diameter.

3. The catalyst of claim 1 wherein at least about 50 percent of said particles of substantially catalytically inert inorganic oxide have a size of less than about 2 microns in diameter.

4. The catalyst of claim 1 wherein said particles of zeolite have a size ranging from about 0.1 to about 10 microns.

5. The catalyst of claim 1 wherein said zeolite comprises from about 0.1 to about 40 weight percent, said substantially catalytically inert inorganic oxide comprises from about 5 to about 40 weight percent, and said catalytic inorganic oxide matrix comprises from about 40 to about 90 weight percent, all said weights being based on the total catalyst.

6. The catalyst of claim 1 wherein said zeolite comprises from about 5 to about 20 weight percent, said substantially catalytically inert inorganic oxide comprises from about 10 to about 30 weight percent and said catalytic inorganic oxide matrix comprises from about 50 to about 80 weight percent, all said weights being based on the total catalyst.

7. The catalyst of claim 1 wherein said substantially inert inorganic oxide is selected from the group consisting of alumina, silica, titania, zirconia, magnesia and mixtures thereof.

8. The catalyst of claim 1 wherein said substantially catalytically inert inorganic oxide comprises a porous alumina.

9. The catalyst of claim 1 wherein said matrix comprises silica-alumina.

10. The catalyst of claim 1 wherein said zeolite has a uniform pore diameter ranging from about 6 to about 15 Angstroms and wherein the silica to alumina ratio of said zeolite is greater than 3.

11. A process for the preparation of a catalyst, which comprises:
    (a) blending an inorganic oxide hydrogel with particles of a crystalline, aluminosilicate zeolite and particles of a substantially catalytically inert inorganic oxide, said particles of inert inorganic oxide having a size of less than about 10 microns in diameter and having a surface area greater than 200 square meters per gram and having at least 0.2 cubic centimeter per gram of its pore volume in pores having diameters ranging from about 90 to about 200 Angstroms;
    (b) recovering the solids from said blend;
    (c) washing with a liquid medium the solids of step (b) substantially free of extraneous metal salts;
    (d) separating the washed solids from said liquid medium;
    (e) drying the separated solids resulting from step (d) to a moisture content ranging from about 8 to about 15 weight percent, and
    (f) recovering a catalyst comprising particles of said zeolite and particles of said inert inorganic oxide dispersed as discrete particles in an inorganic oxide matrix.

12. In the process of claim 11, the additional step of steam-treating said catalyst for a time sufficient to produce a catalyst having at least about 0.4 cubic centimeters of its pore volume in pores having diameters greater than 90 Angstroms.

13. The process of claim 11 wherein said substantially catalytically inert inorganic oxide comprises alumina and wherein said inorganic oxide matrix comprises amorphous silica-alumina.

14. The process of claim 11 wherein at least about 50 percent of said inert inorganic oxide particles have a size of less than about 5 microns in diameter.

15. The process of claim 11 wherein said zeolite particles have a size ranging from about 0.1 to about 10 microns in diameter.

16. The catalyst of claim 1 wherein said catalyst has at least 0.4 cubic centimeter per gram of its pore volume in pores of greater than 90 Angstroms in diameter.

* * * * *